Feb. 26, 1963   D. A. WALTHER   3,079,175
FIFTH WHEEL COUPLER ASSEMBLY
Filed Dec. 21, 1961   3 Sheets-Sheet 1

INVENTOR.
DANIEL A. WALTHER
BY
ATTORNEYS

Feb. 26, 1963   D. A. WALTHER   3,079,175
FIFTH WHEEL COUPLER ASSEMBLY
Filed Dec. 21, 1961   3 Sheets-Sheet 2

INVENTOR.
DANIEL A. WALTHER
BY
ATTORNEYS

United States Patent Office 3,079,175
Patented Feb. 26, 1963

3,079,175
FIFTH WHEEL COUPLER ASSEMBLY
Daniel A. Walther, Dayton, Ohio, assignor to The Dayton Steel Foundry Company, Dayton, Ohio, a corporation of Ohio
Filed Dec. 21, 1961, Ser. No. 161,064
12 Claims. (Cl. 280—434)

The present invention relates generally to improvements in trailer coupler construction. More particularly, the invention relates to devices for coupling a tractor to a trailer, which are commonly referred to in the art as fifth wheels.

Basically, such a tractor-trailer type coupler assembly includes a vertically depending kingpin on the front of the trailer which seats in an appropriate slot in the fifth wheel mounting on the rear of the tractor. The kingpin is retained in the fifth wheel slot by an appropriate locking mechanism.

Primarily, the coupling assembly must be constructed sufficiently sturdily to maintain the connection between the trailer and the tractor even under the most severe operating conditions and yet permit easy manual disconnection.

To disconnect a fifth wheel coupling assembly, the operator generally manipulates a control on the fifth wheel while standing or stooping at the side of the trailer. Most prior art coupling devices require a great deal of physical exertion to unlock, especially if the parts of the assembly are slightly worn or if the tractor and trailer are so positioned that the kingpin is exerting pressure against the locking mechanism.

Moreover, in order to provide a locking mechanism which is automatically set to receive a kingpin upon release of the previously held pin, the prior art mechanisms have been extremely complex and therefore not only more expensive but also more subject to wear.

It is therefore an object of the present invention to provide an improved locking mechanism which will positively engage and lock the kingpin in coupled position and which can be manually unlocked under any conditions by a minimum of physical effort on the part of the operator.

It is a further object of the present invention to provide an improved cooperative locking mechanism and latch means therefor which will reset for automatic recoupling by uncoupling the previously coupled kingpin.

It is a still further object of the present invention to provide an improved locking mechanism which will not automatically recouple unless the kingpin is properly engaged.

It is a still further object of the present invention to provide a fifth wheel coupling assembly having the above mechanism and an improved means for absorbing the shocks between the kingpin and the fifth wheel, which are particularly severe during the recoupling operation, and which means also eliminates shock, or play, between the kingpin and the locking mechanism.

It is a still further object of the present invention to provide a fifth wheel coupling assembly incorporating the above improvements and yet comprising a minimum number of parts all of which are simplified and uncomplex, thereby reducing the manufacturing costs as well as the potential for mechanical failure and wear.

These and other objects of the invention, and further advantages thereof, will become apparent in the following specification and are accomplished by means hereinafter described and claimed.

One preferred embodiment is shown by way of example in the accompanying drawings and hereinafter described in detail without attempting to show all of the various forms and modifications in which the invention might be embodied; the invention being measured by the appended claims and not by the details of the specification.

Referring to the drawings.

Figure 1:
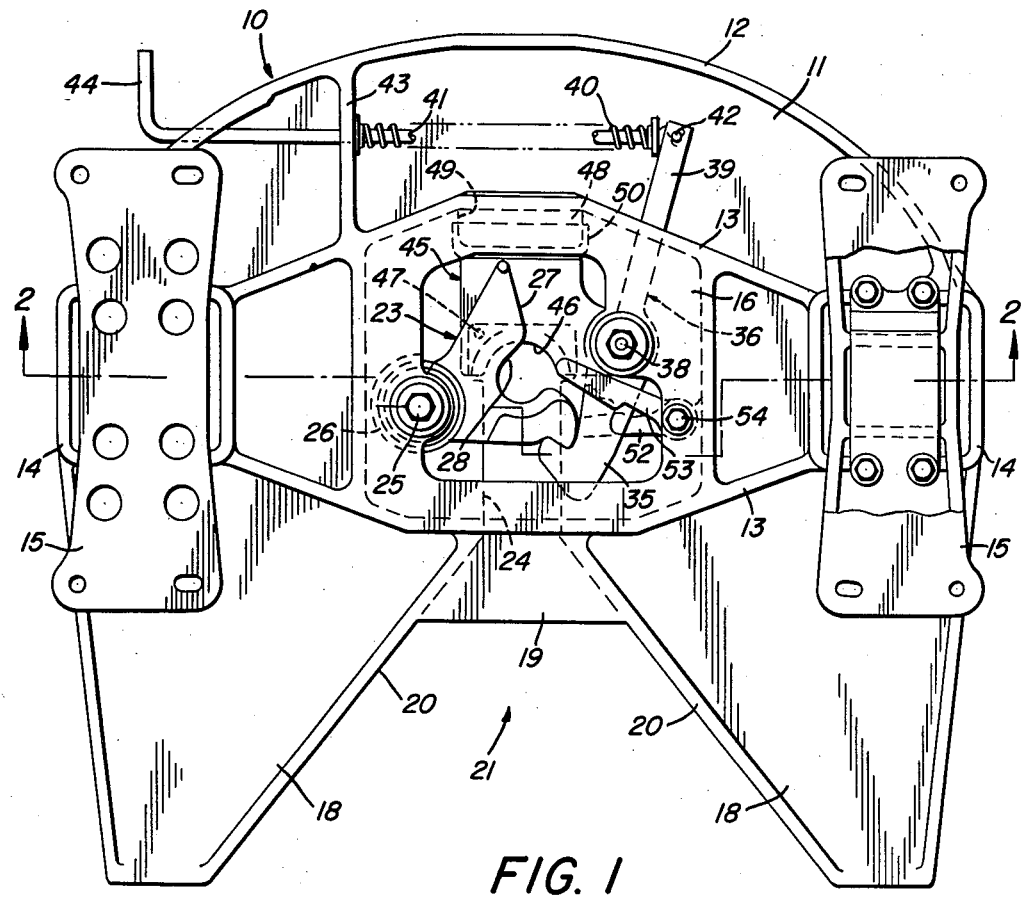
FIG. 1 is a bottom plan view of the improved fifth wheel according to the present invention.
Figure 2:
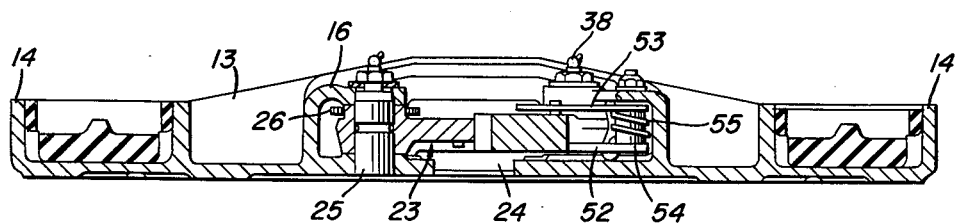
FIG. 2 is a cross sectional view taken substantially on 2—2 of FIG. 1.

In general, a fifth wheel coupling assembly according to the present invention utilizes a standard fifth wheel having a slotted top plate mounted on the rear of a tractor, the fifth wheel having an improved locking mechanism to positively engage and lock a kingpin. The locking mechanism comprises a one-piece coupler jaw pivoted beneath the top plate at one side of the fifth wheel slot and swingable in relation to the slot so as to engage a kingpin therein within an arcuate recess on one edge of the coupler jaw. When the coupler jaw is rotated to engage a kingpin in coupled position, the coupler jaw is engaged by a locking bar horizontally pivoted beneath the top plate of the fifth wheel on the opposite side of the slot from the coupler jaw pivot point. The locking bar has an arcuate engaging surface with the center of the arcuate engaging surface being substantially coincident with the pivot point of the locking bar. The mating surface on the coupler jaw is similarly arcuate.

The improved cooperative latch means comprises dual lock latches operative in an escapement-like manner to preset the locking mechanism for automatic recoupling.

In the drawings the fifth wheel coupler assembly, represented generally by the numeral 10, incorporates a standard fifth wheel having a top plate 11 of conventional shape with a peripheral depending flange 12 and strengthening webs 13. The top plate is secured to the rear platform of a tractor (not shown) by a pair of depending bosses 14 pivotally connected to supporting brackets 15. In the area between brackets 15 and strengthening webs 13 the underside of the top plate 11 has a dependent underhousing 16 which protects and provides support for the several operating elements described below.

The rear portion of the top plate has rearwardly divergent leg portions 18, reinforced by a bottom web plate 19, the inner edges 20 of which define the guide opening 21 adapted to guide a kingpin into engagement with the coupler jaw, indicated generally by the numeral 23.

The coupler jaw 23 is pivotally mounted within underhousing 16 so as to rotate horizontally across the rearward end of a kingpin slot 24 communicating with the guide opening 21. The coupler jaw pivots on a pin 25 extending between top plate 11 and underhousing 16 and is biased to rotate rearwardly and assume the pre-couple receiving position shown in FIG. 5 by a coil coupler spring 26.

Figure 3:
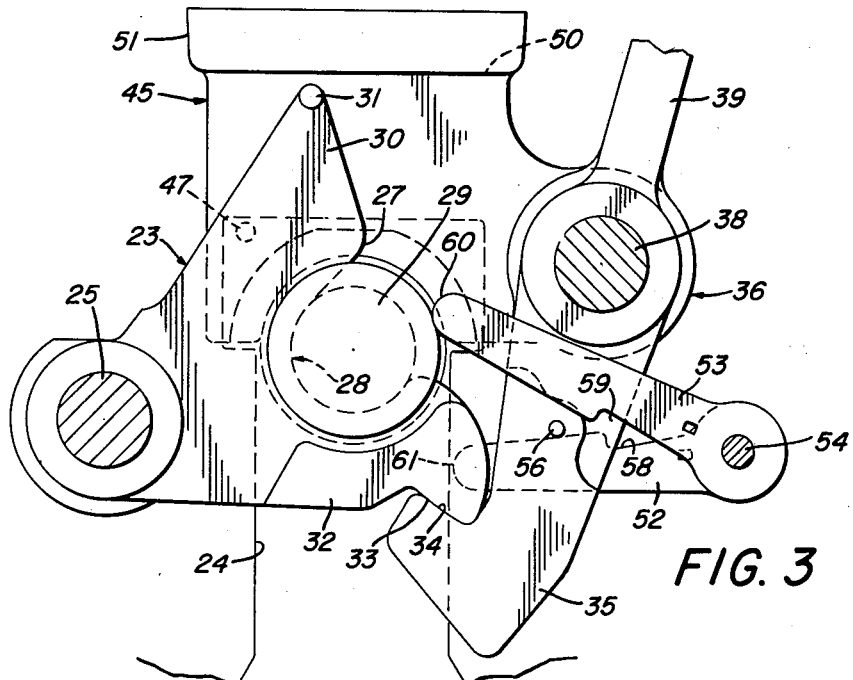
FIG. 3 is an enlarged fragmentary area of FIG. 1 showing the locking mechanism engaging a kingpin and locked in that position.

The coupler jaw has a cam surface 27 and an adjacent arcuate recess 28 on one edge. The recess 28 is adapted to engage a kingpin 29, as is best shown in FIG. 3. The coupler jaw 23 also includes a forwardly directed extension 30 at the extreme end of which is a depending pin or finger 31, the purpose of which is more fully hereinafter described.

Rearwardly of recess 28 the coupler jaw 23 forms a gate arm 32 on the rear side of which is an arcuate locking surface 33 which cooperatingly engages a similar arcuate surface 34 on the jaw portion 35 of the locking bar 36. Bar 36 is freely pivoted on a pin 38 which is positioned on the opposite side of slot 24, from and preferably forward of, pin 25. Pin 38 also extends between the top plate 11 and the underhousing 16.

A throw arm portion 39 of the locking bar 36 extends generally forwardly from the pivot point 38 in an opposite direction from the jaw portion 35.

By making the engaging surface 34 on bar 36 arcuate about the pivot point of bar 36—i.e., on an arc about the center of pin 38—the locking bar 36 will positively engage and retain the coupler jaw 23 in the coupled position depicted in FIG. 3 and yet will release the coupler jaw with the minimum expenditure of effort. Were the center of the arc placed between pin 38 and slot 24 the locking bar 36 would tend to unlock merely by the pressure of the coupler jaw 23 thereagainst. Were the center of the arc placed on the other side of pin 38 away from slot 24, the locking bar 36 would bind by the least pressure from coupler jaw 23.

To reduce pressure concentration and assure the maximum operating efficiency of the locking mechanism, the engaging surface 33 on coupler jaw 23 is preferably of arcuately mating configuration.

To prevent inadvertent release of the locking bar 36 from the coupler jaw 23 and to actuate the locking bar during automatic recoupling, a helical compression spring 40 biases the locking bar toward the locked position. The spring 40 is positioned on the outside of release rod 41 which is pivotally attached to the forwardmost end of throw arm 39 by pin 42 and extends outwardly to the side of the fifth wheel passing through strengthening flange 43 and peripheral flange 12 terminating in a suitable handle 44. The compression of spring 40 between strengthening flange 43 and throw arm 39 effectively biases the locking bar 36 into locking engagement with coupler jaw 23.

To absorb the shock or impact of coupling and to eliminate slack the fifth wheel assembly incorporates a compression jaw, indicated generally by the numeral 45, which is also pivoted on pin 38. The rearward surface of compression jaw 45 presents an arcuate recess 46 to engage a kingpin at the rear of slot 24, and the forwardmost portion is adapted to engage a resilient compression bushing 48 received in a recess 49 in underhousing 16. As shown, the flat surface 50 defining the bushing engaging portion on compression jaw 45 is provided with a peripheral skirt 51 which circumscribes bushing 48. The compression jaw 45 is preferably limited to rotate through an arc of approximately 5°. This can be controlled by having the dimension of skirt 51 such that it contacts strengthening web 13 after the jaw 45 has rotated through the desired arc or by having a stop lug 47 depending from the jaw 45 which will appropriately contact the forward end of the kingpin slot 24. Bushing 48 is preferably of neoprene or some other resilient material which is unaffected by oils or grease.

The improved latching mechanism comprises an upper and lower lock latch bar 52 and 53, respectively, pivotally mounted on a common stud 54 which also extends between top plate 11 and underhousing 16. The upper latch bar 52 extends toward slot 24 above locking bar 36 and lower lock latch bar 53 is similarly directed, below bar 36. A helical latch spring 55 is positioned around stud 54 and interconnects latch bars 52 and 53 so as to cause them to rotate in opposite directions toward a latch pin 56 positioned therebetween and which extends above and below locking bar 36 in which it is secured.

The opposed edges of latch bars 52 and 53 are each provided with a latch notch 58 and 59, respectively, which engage latch pin 56 in escapement-like fashion to automatically reset the locking mechanism for recoupling.

Figure 4:
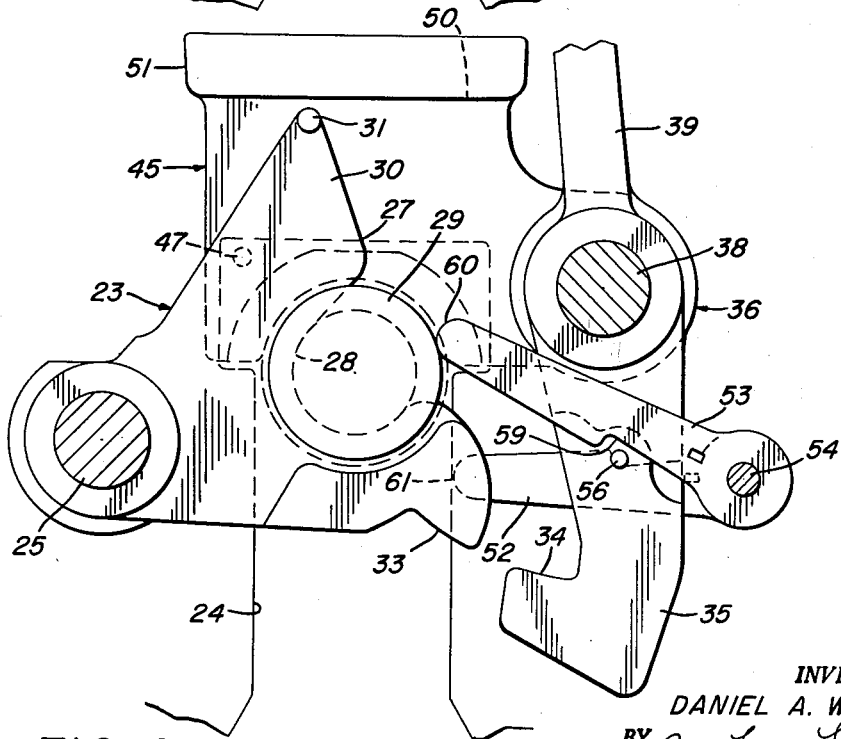
FIG. 4 is a view similar to FIG. 3 depicting the locking mechanism unlocked and latched preparatory to disengagement of the pin therefrom.
Figure 5:
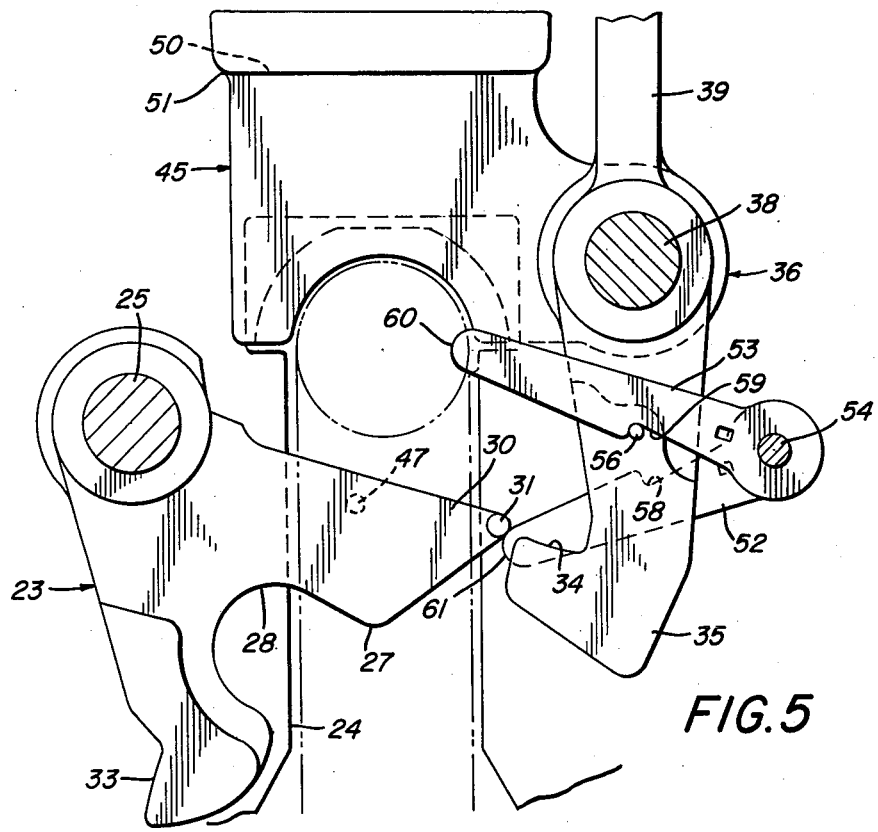
FIG. 5 is a view similar to FIGS. 3 and 4 depicting the locking mechanism after disengagement of the pin and with the latch mechanism having been set for automatic recoupling.

The operation of the improved fifth wheel assembly is best understood by reference to the sequential operation of the locking mechanism depicted in FIGS. 3 through 5.

To release the coupling mechanism the locking bar is rotated by pulling handle 44, shown in FIG. 1. In moving the locking bar 36 sufficiently to disengage the arcuate surface 34 thereon from the mating surface 33 on coupler jaw 23, the latch pin 58 on bar 36 is moved to a position where it can be engaged by the latch notch 58 on upper lock latch bar 52. Biasing pressure of helical spring 55 snaps latch notch 58 into engagement with pin 56. This restrains bar 36 against the biasing pressure of compression spring 40 around release rod 41, and the kingpin 29 is free to be moved rearwardly out of the slot 24.

When the kingpin 29 is locked in the FIG. 3 or coupled position at the forwardmost end of slot 24 the outer end 60 of lower lock latch bar 53 is engaged thereby and the lower lock latch bar 53 is thereby prevented from engaging latch pin 56. After the coupling mechanism has been unlocked, as in FIG. 4, and the kingpin 29 is moved rearwardly out of slot 24, as shown in FIG. 5, the lower lock latch bar 52 is rotated, by helical spring 55, so that the latch notch 59 thereon also engages pin 56. As the kingpin 29 clears the coupler jaw 23 the depending finger 31 on the forward extension 30 of jaw 23 engages the outer end 61 of upper lock latch bar 52, disengaging latch notch 58 from pin 56. It will be noted that notch 59 on lower lock latch 53 is longer than the notch 58 on the upper lock latch 52 so that if notch 58 is disengaged from pin 56 the locking jaw on bar 36 rotates slightly toward slot 24 by the pressure of compression spring 41. This escapement-like movement of the latching mechanism prevents re-engagement of the upper lock latch 52 with pin 56 during the recoupling operation. It should further be noted that the upper lock latch 52 is sufficiently shorter than the lower lock latch 53 so as not to extend into the slot 24 and engage the kingpin 29.

The uncoupling of the kingpin 29 thus automatically resets the locking mechanism for recoupling, as is depicted in FIG. 5, and the coupler jaw 23 is maintained in the pre-couple receiving position by the action of spiral spring 26.

To recouple, the tractor is manipulated so as to cause the kingpin 29 to be moved forwardly into slot 24 where it engages cam 27 and recess 28. The coupler jaw 23 rotates with the pin 29 as it is received in arcuate recess 28 until the pin engages the compression jaw 45 which yields by the action of bushing 48 to absorb the shock of the coupling maneuver. As the kingpin 29 reaches this coupled position it engages the outer end 60 of lower lock latch 53, thus rotating latch 53 sufficiently to disengage notch 59 from pin 56. Because notch 59 is longer than notch 58 in lock latch 52, there is no opportunity for the pin 56 to be re-engaged by notch 58 and the locking bar is forced to pivot and engage coupler jaw 23 by the action of compression lock spring 41, and recoupling is thus automatically effected.

During the recoupling operation, which entails backing the tractor into engaging relation with the trailer, it sometimes occurs that the front of the trailer jumps or is so positioned that the kingpin bounces or is received in the kingpin slot in such a fashion that the bottom of the kingpin rests on top of the coupler jaw 23. Other known recoupling mechanisms would be actuated even by this imperfect mating of parts and indicate that proper coupling had taken place. However, in a coupling assembly constructed according to the present invention even though the coupler jaw 23 could be rotated to coupled position by this improper positioning of the kingpin, the lower latch bar 53 could not be operated and such improper coupling could not be effective.

What is claimed is:

1. A fifth wheel having a top plate with a rear opening formed by divergent leg portions, said opening terminating in a longitudinally elongated medial slot for receiving a vehicle kingpin, a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, lock latch bars, said latch bars movably mounted on the same side of said medial slot as said lock bar, means on said latch bars selectively to retain said lock bar disengaged from said coupler jaw, means on said coupler jaw to disengage one said latch bar from said lock bar when said coupler jaw is rotated from coupled to receiving position, and means on said other latch bar to disengage it from said lock bar by entry of a kingpin in coupled position.

2. A fifth wheel having a top plate with a rear opening formed by divergent leg portions, said opening terminating in a longitudinally elongated medial slot for receiving a vehicle kingpin, a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, lock latch bars pivoted beneath said top plate on the same side of said slot as, and outwardly of, said lock bar, said latch bars swingable transversely of said lock bar, engaging means on said lock bar for engaging said latch bars when said lock bar is disengaged from said coupler jaw, one said latch bar passing horizontally on each side of said engaging means, the side of said latch bar toward said engaging means having a latch notch for engaging said engaging means when said lock bar is disengaged from said coupler jaw, resilient means for biasing said latch bars towards said engaging means, means on said coupler jaw to disengage one said latch bar from said lock bar when said coupler jaw is rotated from coupled to receiving position, and means on said other latch bar to disengage it from said lock bar by entry of a kingpin in coupled position.

3. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longtiudinally disposed locking bar, said locking bar pivoted beneath said top plate on the opposite side of said medial slot from said coupler jaw, an arcuate locking surface on said locking bar for engaging the locking surface of said coupler jaw the arc of said arcuate locking surface centered substantially at the pivot point of said locking bar, means for biasing said locking bar to engage said coupler jaw, means for disengaging said locking bar from said coupler jaw, upper and lower lock latch bars pivoted beneath said top plate on the same side of said slot as, and outwardly of, said lock bar, said upper latch bar swingable transversely above said lock bar, said lower latch bar swingable transversely beneath said lock bar, a latch pin extending through said lock bar, said latch bars biased toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position 4. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower latch bars pivoted beneath said top plate on the same side of said slot as, and outwardly of, said lock bar, said upper latch bar swingable transversely above said lock bar, said lower latch bar swingable transversely beneath said lock bar, a latch pin extending through said lock bar with a latch bar passing on each side thereof, said latch bars biased toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position.

5. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower lock latch bars pivoted beneath said top plate on the same side of said slot as, and outwardly of, said lock bar, said upper latch bar swingable transversely above said lock bar, said lower latch bar extending into said slot and swingable transversely beneath said latch bar, a latch pin extending through said lock bar with a latch bar passing on each side thereof, means for biasing said latch bars toward said latch pin, a latch notch on said upper latch bar for engaging said latch pin on said lock bar and maintaining said lock bar disengaged from said coupler jaw, a similar notch on said lower latch bar, the latch notch on said lower latch bar extending closer to said medial slot than the notch on said upper latch bar, means on said coupler jaw to disengage said upper latch bar from said lock bar when said coupler jaw is rotated from coupled to receiving position, the end of said lower latch bar extending into said medial slot where it is contacted by entry of a kingpin in coupled position to disengage said lower latch bar from said lock bar.

6. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower lock latch bars pivoted beneath said top plate on the same side of said slot as, and outwardly of, said lock bar, said upper latch bar swingable transversely above said lock bar, said lower latch bar extending into said slot and swingable transversely beneath said latch bar, a latch pin extending through said lock bar with a latch bar passing on each side thereof, means for biasing said latch bars toward said latch pin, a latch notch on said upper latch bar for engaging said latch pin on said lock bar and maintaining said lock bar disengaged from said coupler jaw, a similar notch on said lower latch bar, the latch notch on said lower latch bar extending closer to said medial slot than the notch on said upper latch bar, a forwardly extending arm on said coupler jaw, a finger depending from said forwardly extending arm, said finger adapted to contact said upper latch bar when said coupler jaw is rotated from coupled to receiving position to disengage said upper latch bar from said lock bar, the end of said lower latch bar extending into said medial slot where it is contacted by entry of a kingpin in coupled position to disengage said lower latch bar from said lock bar.

7. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swigable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower lock latch bars pivoted beneath said top plate on the same side of said slot as, and outwardly of, said lock bar, said upper latch bar swingable transversely above said lock bar, said lower latch bar extending into said slot and swingable transversely beneath said latch bar, a latch pin extending through said lock bar with a latch bar passing on each side thereof, means for biasing said latch bars toward said latch pin, a latch notch on said upper latch bar for engaging said latch pin on said lock bar and maintaining said lock bar disengaged from said coupler jaw, a similar notch on said lower latch bar, the latch notch on said lower latch bar extending closer to said medial slot than the notch on said upper latch bar, a forwardly extending arm on said couper jaw, a finger depending from said forwardly extending arm, said finger adapted to contact said upper latch bar when said coupler jaw is rotated from coupled to receiving position to disengage said upper latch bar from said lock bar, the end of said lower latch bar extending into said medial slot being contacted by entry of a kingpin in coupled position to disengage said lower latch bar from said lock bar, a pivotal compression jaw at the forward end of said medial slot, resilient means for absorbing the forward thrust of said compression jaw.

8. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower latch bars pivoted on a common shaft beneath said top plate on the same side of said slot as, and outwardly of, said lock bar, said upper latch bar swingable transversely above said lock bar, said lower latch bar swingable transversely beneath said lock bar, a latch pin extending through said lock bar with a latch bar passing on each side thereof, common spring means biasing said latch bars toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position.

9. A fifth wheel having a top plate with a rear opening formed by divergent leg portions, said opening terminating in a longitudinally elongated medial slot for receiving a vehicle kingpin, and a locking and latching mechanism comprising, a compression jaw pivotally mounted beneath said top plate and extending across the forward end of said slot, resilient means for absorbing the forward thrust of said compression jaw, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower latch bars pivoted beneath said top plate on the same side of said slot as, and outwardly of, said lock bar, said upper latch bar swingable transversely above said lock bar, said lower latch bar swingable transversely beneath said lock bar, a latch pin extending through said lock bar with a latch bar passing on each side thereof, said latch bars biased toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position.

10. A fifth wheel having a top plate with a rear opening formed by divergent leg portions, said opening terminating in a longitudinally elongated medial slot for receiving a vehicle kingpin, and a locking and latching mechanism comprising, a compression jaw pivotally mounted beneath said top plate and extending across the forward end of said slot, resilient means for absorbing the forward thrust of said compression jaw, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, an arcuate locking surface on said locking bar for engaging the locking surface of said coupler jaw, the arc of said arcuate locking surface centered substantially at the pivot point of said locking bar, means for biasing said locking bar to engage said coupler jaw, means for disengaging said locking bar from said coupler jaw, upper and lower latch bars pivoted on a common shaft beneath said top plate on the same side of said slot as, and outwardly of, said lock bar, said upper latch bar swingable transversely above said lock bar, said lower latch bar swingable transversely beneath said lock bar, a latch pin extending through said lock bar with a latch bar passing on each side thereof, common spring means biasing said latch bars toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position.

11. A fifth wheel having a top plate with a rear opening formed by divergent leg portions, said opening terminating in a longitudinally elongated medial slot for receiving a vehicle kingpin, a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, a locking surface on said locking bar for engaging the locking surface of said coupler jaw, means for biasing said locking bar to engage said coupler jaw, means for disengaging said locking bar from said coupler jaw, lock latch bars, said latch bars movably mounted on the same side of said medial slot as said lock bar, means on said latch bars selectively to retain said lock bar disengaged from said coupler jaw, means on said coupler jaw to disengage one said latch bar from said lock bar when said coupler jaw is rotated from coupled to receiving position, and means on said other latch bar to disengage it from said lock bar by entry of a kingpin in coupled position.

12. A fifth wheel having a top plate with a rear opening formed by divergent leg portions, said opening terminating in a longitudinally elongated medial slot for receiving a vehicle kingpin, and a locking and latching mechanism comprising, a coupler jaw pivoted on one side of said medial slot beneath said top plate and swingable across the rear of said slot and adapted to engage a vehicle kingpin in coupled position, a locking surface on the rear of said coupler jaw, a generally longitudinally disposed locking bar, said locking bar pivoted beneath said top plate on the opposite side of said medial slot from said coupler jaw, a locking surface on said locking bar for engaging the locking surface of said coupler jaw, means for biasing said locking bar to engage said coupler jaw, means for disengaging said locking bar from said coupler jaw, upper and lower lock latch bars pivoted beneath said top plate on the same side of said slot as, and outwardly of, said lock bar, said upper latch bar swingable transversely above said lock bar, said lower latch bar swingable transversely beneath said lock bar, a latch pin extending through said lock bar, said latch bars biased toward said latch pin, the sides of said latch bars toward said latch pin having a latch notch for engaging said pin when said lock bar is disengaged from said coupler jaw, resilient means for biasing said latch bars toward said latch pin, means on said coupler jaw for disengaging said upper latch bar from said lock bar when said coupler jaw is rotated from coupled to receiving position, and means on said lower latch bar to disengage it from said lock bar by entry of a kingpin in coupled position.

References Cited in the file of this patent

UNITED STATES PATENTS

| 1,991,507 | Ketel | Feb. 19, 1935 |
| 2,885,222 | Walther | May 5, 1959 |

FOREIGN PATENTS

| 70,942 | France | Mar. 16, 1959 |
| | (First addition to Patent 1,144,733) | |
| 1,022,694 | France | Dec. 12, 1952 |